United States Patent
Wardzala

(10) Patent No.: US 7,558,036 B2
(45) Date of Patent: Jul. 7, 2009

(54) HIGH SPEED LIGHTNING REGULATOR CIRCUIT WITH SELF TEST ATTRIBUTES

(75) Inventor: Robert W. Wardzala, Belvidere, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 344 days.

(21) Appl. No.: 11/508,415

(22) Filed: Aug. 23, 2006

(65) Prior Publication Data

US 2008/0055797 A1  Mar. 6, 2008

(51) Int. Cl.
*H02H 9/04* (2006.01)
*H02H 9/02* (2006.01)

(52) U.S. Cl. .................. 361/91.1; 361/100; 361/101

(58) Field of Classification Search ........... 361/91.1, 361/100, 101
See application file for complete search history.

(56) References Cited

U.S. PATENT DOCUMENTS

| | | | |
|---|---|---|---|
| 4,918,390 A * | 4/1990 | Ziv et al. ............ | 324/415 |
| 5,038,051 A * | 8/1991 | Firman et al. ........ | 307/106 |
| 5,502,399 A * | 3/1996 | Imai ................... | 324/765 |
| 6,670,724 B2 | 12/2003 | Ely | |
| 6,700,765 B2 | 3/2004 | Ely | |
| 6,707,656 B1 | 3/2004 | Marshall | |
| 6,738,245 B2 * | 5/2004 | Ely ..................... | 361/91.1 |
| 7,035,070 B2 | 4/2006 | Shiner | |
| 7,054,127 B1 | 5/2006 | Scearce | |

\* cited by examiner

*Primary Examiner*—Stephen W Jackson
*Assistant Examiner*—Scott Bauer
(74) *Attorney, Agent, or Firm*—Carlson, Gaskey & Olds

(57) ABSTRACT

A system for regulating high speed voltage surges, particularly as a result of lightning strikes, which includes a transistor, an isolated voltage provider, and an array of voltage regulating electrical components, where the isolated voltage provider maintains the transistor in a fully on mode unless a voltage surge occurs. In the case of a voltage surge the array of voltage regulating electrical components switches the transistor to linear mode thus providing protection equal to its rating. A method of determining the voltage rating of individual Zener diodes contained within a Zener diode array consisting of shorting out individual diodes from the array and measuring the total voltage rating, then comparing the total voltage rating of the array with no diodes shorted out to the voltage rating of the array with the one diode shorted out.

13 Claims, 1 Drawing Sheet

HIGH SPEED LIGHTNING REGULATOR CIRCUIT WITH SELF TEST ATTRIBUTES

BACKGROUND OF THE INVENTION

This invention relates to the protection of sensitive electronics from voltages exceeding a rated voltage (over voltages). Such over voltages typically occur as a result of lightning strikes.

During aircraft operation it is not uncommon for the aircraft to get struck by lightning, say while flying through a storm. As such, in the design of aircraft, it is necessary to create protection against lightning strikes. This protection is extended not only to persons on board the plane, but also to voltage sensitive electronics for operating the plane. Examples of sensitive electronics may include fuel sensors, altitude sensors, wing controls, etc. If lightning were to strike and these electronics had no protection, the sensitive components (sensing resistors, capacitors, etc.) could be destroyed or have their sensing capabilities damaged. This could lead to malfunctioning sensors and airplane controls.

Another situation where other electronics are subjected to a similar over voltage occurs when there is a large power spike across a power distribution network. In instances such as a power spike unprotected electronic equipment is often damaged or destroyed. As such, the described protection system would be desirable in those applications as well as in an aircraft.

In the prior art one of two methods has typically been used to protect sensitive electronics from over voltages. The first method involves using "voltage clamping" devices placed in parallel with the protected electronics. A voltage clamping device works by allowing any voltage above a rated value to run off to ground. These devices provide protection by converting excess voltage into current, and running the current through a circuit, typically a resistor bank, that converts the current into heat energy, which is then radiated off. This regulates (or clamps) the voltage across the parallel load to a certain predetermined level.

This method has three main drawbacks. The first drawback is that voltage clamping circuits typically convert the current into heat very rapidly, which necessitates an increase in the size, weight, and expense of the device to compensate for this rapid heating. The second drawback resulting from this method is the lack of reliability. The reliability of the protection may become in question due to repeated occurrences of over voltage. If the over voltage event occurs repeatedly it can put wear on the resistor bank and the clamping circuit, thus reducing the resistor bank's and the clamping circuit's effectiveness. The third drawback is the lack of testability of the protection circuit. With this method of protection there is no reliable way to test the protection circuit without subjecting the circuit to a potentially destructive application of voltage. A test could determine the functionality of the protective circuit at the time of the test. However, there would be no indication as to whether the test itself damaged the protective capabilities. Additionally, if the protection circuit were not functional the test itself could destroy the protected electronics.

The second method commonly used to provide over voltage protection involves using a series switch technique to disconnect the circuit when a sensor detects an incoming over voltage. A series switch involves the placement of a switch between the source of the over voltage and the load (electrically the switch is in series with the load). It achieves its function by first sensing the incoming voltage, then using a controller to toggle the switch controlling the load, thereby opening the circuit and preventing any voltage from flowing through the load. The major drawback of this method is that the power supply to the electronics is disrupted, thus necessitating the use of some other means of providing continuous power, such as a battery back-up or other power storage device. Another drawback associated with this method is the reliability and accuracy of switching circuits under varying conditions.

SUMMARY OF THE INVENTION

In this invention the over voltage protection is implemented by placing a transistor between the input and the electronics being protected (the load), with the input connected to the transistor's drain, and the load connected to the transistor's source. A second circuit branch running from the input, and parallel to the transistor, contains a voltage regulator circuit. The voltage regulator circuit is connected to a charge pump circuit and functions as a low power regulator for the charge pump circuitry. Charge pumps consist of electronics that provide an isolated voltage, similar to an isolated power supply. The charge pump circuitry can be constructed using numerous available methods. A switching element is introduced between the voltage regulator and the charge pump circuitry as a means of controlling the power flow to the charge pump circuitry. The switching element is connected to the protected circuit and turns off the charge pump when the protected circuitry is turned off. This saves energy as the charge pump circuitry will power down when the switching element is open.

A voltage clamping/regulating device is connected between the transistor gate, and the return/ground. The voltage clamping/regulating device functions as a series pass voltage regulator, by regulating the amount of voltage allowed past it to a set value. A connection is made to the charge pump between the transistor gate and the voltage clamping/regulating device.

Connected parallel to each voltage regulating electrical component in the voltage clamping/regulating device is a BIT STIM controlled switch. A BIT STIM controlled switch is a switch that is controlled electronically by an external controller using a BIT STIM signal. BIT STIM signals consist of binary signals sent from a controller to a device. Contained within the binary signal is a BIT that tells the switch if it should open or close. Typically the external controller is found within the protected electronics. A connection is made between the charge pump circuitry and the input of the transistor. Additionally the charge pump circuit has a connection to return/ground.

While the device is operating in Normal Mode (no over voltage is present) the charge pump circuitry provides a steady signal to the transistor gate turning the transistor "on" and allowing current to flow through the transistor virtually unimpeded. This provides minimal voltage drop across the transistor, thereby providing the load with the full input.

When the device is operating in Protection Mode (when an over voltage is present) the voltage clamping device will conduct once the set voltage has been reached. This forces the transistor into "linear mode" which will limit the voltage provided to the load. The amount of protection provided to the circuit is limited by the voltage rating of the transistor and the power dissipation rating of the transistor. Additional transistors may be used to increase the protection capability.

When the device is operating in Self Test Mode one of the switch elements connected to the voltage clamping device shorts out one of the voltage regulating electrical components in the voltage clamping device. The controller then notes the voltage supplied to the circuit. This process continues until the controller has noted the voltage with each voltage regulating electrical component in the voltage clamping device individually shorted out. The switch elements are controlled by a BIT STIM signal generated by an external controller typically found within the electronics being protected. The controller then verifies the functionality of the over voltage protection of the circuit, without disrupting power flow to the protected electronics.

The above described method eliminates the problems associated with the prior art in that the voltage is regulated and not disrupted, thus there is no need for a battery back-up or another means of dealing with power interruption. The method described does not interrupt the power at any time prior to, during, or after an occurrence of over voltage. Additionally the described method has advantages over the prior art in that the voltage clamping/regulating circuit is capable of being tested for functionality without interrupting power to the protected electronics, and without submitting the electronics to a potentially destructive over voltage. Another advantage this method has over the prior art is that power is dissipated within the transistor according to its rating which eliminates the need for a run off circuit, thus minimizing the size, weight and expense of the device.

These and other features of the present invention can be best understood from the following specification and drawing, the following of which is a brief description.

DETAILED DESCRIPTION OF THE PREFERRED EMBODIMENT

Figure 1:
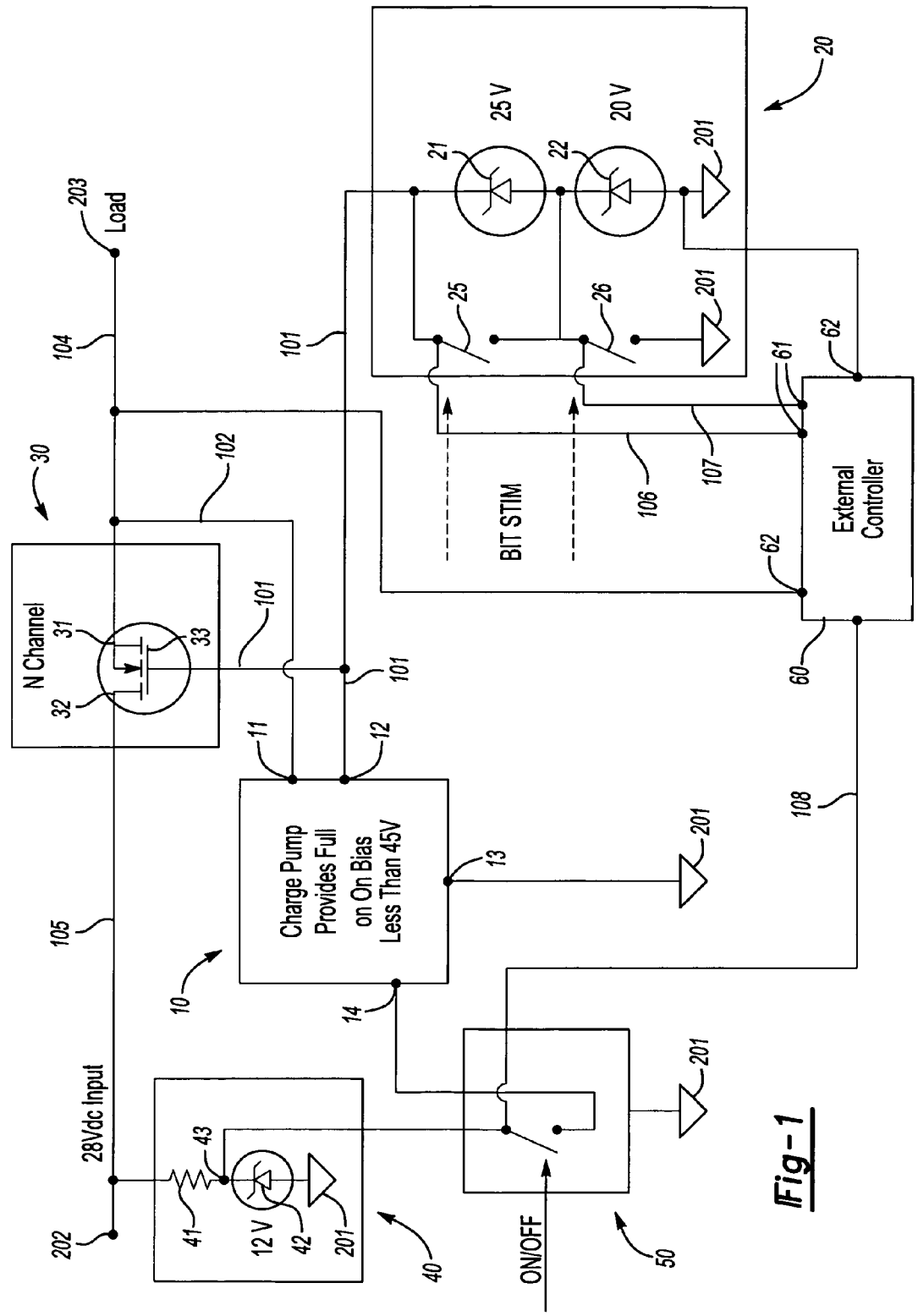
FIG. 1 illustrates an embodiment of the inventive circuit.

A voltage regulator circuit is shown in FIG. 1, and includes an N Channel Field Effect Transistor (F.E.T.) 30, a low voltage power supply 40, an isolated power supply in the form of charge pump circuitry 10, and a voltage regulating Zener diode array 20.

Over voltage protection is implemented by placing the N channel F.E.T. 30 in enhancement mode between the 28 Vdc input 202, and the load 203, with the 28 Vdc input 202 connected to the drain 32 of the N channel F.E.T., and the load 203 connected to the source 31 of the N channel F.E.T. The low voltage power supply 40 is fed from the input 202 to the Charge Pump Circuitry 10.

The low voltage power supply 40 consists of a resistor 41 in series with a Zener diode 42. The anode of the Zener diode is connected to ground 201, and the cathode is connected to the resistor 41 and a switch 50 at node 43. The low voltage power supply 40 regulates the input of the charge pump 10 by providing it with a steady 12V. This allows the charge pump 10 to provide an isolated voltage to the N Channel F.E.T. 30. A secondary control of the power flow to the charge pump circuitry 10 is provided by the ON/OFF switch 50 connected in series between node 43 and the charge pump circuitry 10. Switch 50 removes power to the charge pump 10 when the load 203 is turned off. This functions to save energy as there is no need to operate the charge pump 10, when the load 203 is not using the input 202. Switch 50 is controlled in the illustrated embodiment via line 108 from the external controller 60. The charge pump is connected to switch 50 at node 14. The charge pump 10 additionally has connections to ground 201 at node 13, to the transistor gate 33 via line 101 at node 12, and to wire 104 at node 11. Additionally connected to the transistor gate via line 101 is an array of Zener diodes and BIT STIM switches 20. In the illustrated embodiment the array consists of two Zener diodes 21, 22, and two BIT STIM switches 25, 26. The Zener diodes 21, 22 are connected in series between the transistor gate 33 and 28Vdc return/ground 201, with a BIT STIM switch 25, 26 parallel to each one. The BIT STIM switches 25, 26 are maintained in the open position except when the circuit is operating in self test mode, as described below. This allows the BIT STIM switches 25, 26 to be present in the circuit at all times, yet not adversely affect operation during normal and over voltage conditions.

When the circuit is operating at a normal input (28 Vdc), the charge pump circuitry 10 receives a steady 12V input from the low power voltage regulator 40 through switch 50. The charge pump then outputs an isolated voltage to the N channel F.E.T. gate 33. This isolated voltage places the N channel F.E.T. 30 in fully on mode. While in fully on mode, the N channel F.E.T. 30 allows the full input voltage 202 to pass to the load 203 virtually unimpeded.

When the circuit is under an over voltage (in the illustrated circuit this occurs when greater than 45 volts are input), the voltage regulating Zener diode array 20 will conduct, which forces the N channel F.E.T. 30 into linear mode/series pass regulation. The Zener diodes 21, 22 work by blocking current from flowing through them while the voltage across their terminals is less than their rated voltage. In the illustrated Zener diode array 20 the two Zener diodes 21, 22 are rated 25V and 20V respectively. Each one prevents any current from moving through them as long as their voltage has not been exceeded, essentially opening the circuit. This allows the circuit to be regulated at 45V (20V+25V). Whenever the voltage exceeds 45V the excess voltage is allowed to run off to return/ground 201, without it entering the load 203. The Zener diodes 21, 22 act as low impedance grounding circuits for the excess voltage. This draws the excess power down through the transistor into the Zener diode array 20. The excess power is dissipated as heat in the transistor 30 according to its rating, and excess current is sent to return/ground through the Zener diodes 21, 22. The use of the transistor 30 as a switching element and as a power dissipation device minimizes the amount of additional electronics needed to dissipate the excess power. When the N channel F.E.T 30 is forced into linear mode/series pass regulation it allows any voltage in excess of 45V to be drawn through the Zener Diode array 20, resulting in 45V voltage regulation to the load.

Excess power exists in the over voltage scenario because the load and the voltage regulating circuit are only receiving 45V. This excess power is dissipated in the N channel F.E.T. transistor 30. The amount of excess power that can potentially be dissipated is limited by the power/energy/joule rating of the N channel F.E.T. used. If the N channel F.E.T. does not have a high enough power/energy/joule rating to dissipate the excess power, multiple N channel F.E.T.'s may be used to dissipate more power.

The controller can operate in test mode to test the circuit's reliability. To perform the reliability test, the external controller 60 first sends a signal to BIT STIM switch 25 via line 108 which closes the switch. The external controller 60 then uses sensors 62 to detect the load voltage. The sensors 62 are depicted placed across Line 104 and 28 VDC return/ground 201. The sensors 62 can be placed in any configuration that will allow them to sense the voltage across the Zener diode array and the load. The sensors for the external controller 60 are placed on line 104 and on 28 Vdc return/ground 201 in the illustrated circuit. The external controller 60 then stores the detected value and sends a signal, via line 106, to close switch 25 and sends a signal via line 107 to open switch 26. The external controller 60 again stores the sensed voltage value. Once the external controller has detected the voltage value of each Zener diode 21, 22 it sums them to determine if the combined protection is functional. This method can be modified to include any number of Zener diodes or other non-Zener diode types of voltage regulating components within a voltage regulating circuit.

Additional variances could be made and still fall within the scope of the invention. These variances include but are not limited to utilizing other transistor types instead of the specific transistor type described in the detailed description. The switches listed could be either other types of transistors or other similar semiconductor devices. Also, the charge pump circuitry could be replaced with an alternate means of providing an isolated voltage.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A voltage regulator circuit comprising;
   a transistor in series between an input and a load;
   an electrical component maintaining said transistor in fully on mode when no over voltage is present;
   at least one electrical switch parallel to at least one voltage regulating electrical component;
   said at least one voltage regulating electrical component connected between the transistor gate and an electrical return;
   said at least one voltage regulating electrical component arranged and connected in such a manner so that during an over voltage occurrence said transistor operates in linear mode, thereby regulating the load voltage; and
   wherein said electrical switch is capable of being independently controlled by a controller, such that said controller may record voltage readings with said at least one voltage regulating electrical component being individually electrically removed from the circuit.

2. The voltage regulator circuit as set forth in claim 1, wherein excess power is dissipated in said transistor.

3. The voltage regulator circuit as set forth in claim 1, wherein said at least one voltage regulating electrical component consists of at least one Zener diode.

4. The voltage regulator circuit as set forth in claim 1, wherein said at least one voltage regulating electrical component is connected between a gate of said transistor and said electrical return.

5. The voltage regulator circuit as set forth in claim 1, wherein there are at least two of said electrical switches each associated with at least two voltage regulating electrical components.

6. The voltage regulator circuit as set forth in claim 1, wherein a power switching device is placed such that power to said electrical component maintaining said transistor in fully on mode may be removed.

7. The voltage regulator circuit as set forth in claim 6, wherein the electrical state of said power switching device corresponds to the desired electrical state of the protected electronics.

8. The device of claim 1 wherein said device additionally comprises an external controller.

9. The device of claim 1 wherein said voltage regulating electrical components are capable of being temporarily electrically removed from the circuit via intentional short circuiting.

10. The device of claim 1 wherein said external controller is capable of comparing a determined voltage of said at least one voltage regulating electrical component and capable of comparing the determined voltage to a predefined desired voltage.

11. A voltage regulator circuit comprising:
    a field effect transistor connected in series between a load and an input;
    a low voltage isolated power supply connected between the input and a charge pump circuit;
    said charge pump circuit receiving a low voltage isolated power supply from said isolated power supply;
    said charge pump connected to a gate of said transistor, providing said transistor with a steady voltage;
    a connection between said charge pump and a neutral return;
    at least one Zener diode connected in series with said transistor gate, with a cathode of said at least one Zener diode connected to a neutral return;
    an electronically controlled switch placed in parallel with each of said at least one Zener diode; and
    wherein said electrical switch is capable of being independently controlled by a controller, such that said controller may record voltage readings with said at least one voltage regulating electrical component being individually electrically removed from the circuit.

12. The voltage regulator circuit as set forth in claim 11, wherein said electronically controlled switch is capable of shorting out said at least one Zener diode.

13. A method for testing the voltage rating of individual Zener diodes within a Zener diode array consisting of:
    (a) placing at least one switch in parallel with each Zener diode in said Zener diode array;
    (b) shorting out one of said Zener diodes in said Zener diode away using said switches;
    (c) sensing the load voltage with said Zener diode shorted out;
    (d) storing said sensed load voltage in memory;
    (e) repeating steps (b) through (d) until a value has been stored corresponding to each of said Zener diodes;
    (f) computing the total voltage rating of said Zener diode away using said stored values; and
    (g) determining the individual voltage ratings by subtracting the stored voltage value from the sensed load voltages with no Zener diode shorted out.

* * * * *

UNITED STATES PATENT AND TRADEMARK OFFICE
CERTIFICATE OF CORRECTION

PATENT NO. : 7,558,036 B2
APPLICATION NO. : 11/508415
DATED : July 7, 2009
INVENTOR(S) : Wardzala Page 1 of 1

It is certified that error appears in the above-identified patent and that said Letters Patent is hereby corrected as shown below:

Claim 13, Column 6, Line 52, replace "away" with --array--.

Signed and Sealed this

Twenty-ninth Day of September, 2009

David J. Kappos
*Director of the United States Patent and Trademark Office*